United States Patent [19]
Youngers

[11] 4,117,890

[45] Oct. 3, 1978

[54] ADJUSTABLE MOUNTING FOR SUBTERRANEAN TOOL

[75] Inventor: Stephen Anthony Youngers, Clearwater, Kans.

[73] Assignee: J. I. Case Company, Racine, Wis.

[21] Appl. No.: 844,576

[22] Filed: Oct. 25, 1977

[51] Int. Cl.² .................. A01B 13/08; A01B 35/26
[52] U.S. Cl. .................... 172/40; 172/763; 172/734; 403/4; 172/699
[58] Field of Search ........... 172/699, 763, 739, 752, 172/40, 734; 403/4; 301/9 DN

[56] References Cited

U.S. PATENT DOCUMENTS

| 267,069 | 11/1882 | Forrester | 172/739 |
|---|---|---|---|
| 2,632,265 | 3/1953 | Ryan | 172/699 |
| 2,998,965 | 9/1961 | Larson | 172/699 X |
| 3,002,574 | 10/1961 | Padrick | 172/763 X |
| 3,120,281 | 2/1964 | Peveler | 172/739 X |
| 3,329,468 | 7/1967 | Beith | 301/9 DN |
| 3,363,423 | 1/1968 | Davis | 172/699 |
| 3,396,804 | 8/1968 | Rogers | 172/40 |
| 3,618,237 | 11/1971 | Davis | 172/40 |
| 4,079,789 | 3/1978 | Byrd | 172/739 |

FOREIGN PATENT DOCUMENTS

| 2,135 of | 1926 | Australia | 172/739 |
|---|---|---|---|
| 345 of | 1912 | United Kingdom | 172/739 |

*Primary Examiner*—Richard J. Johnson
*Attorney, Agent, or Firm*—Arthur J. Hansmann

[57] ABSTRACT

An adjustable mounting for a subterranean tool such as one for penetrating the ground and for laying cable or the like. The tool is mounted on a tractor which moves over the ground and forms a cut in the ground, and mounting members support the tool from the tractor in various angled positions depending upon the desired angle for presenting the tool cutting edge in the ground. Mounting members between the tractor and the tool are adjustable for adjusting the ground cutting angle.

9 Claims, 4 Drawing Figures

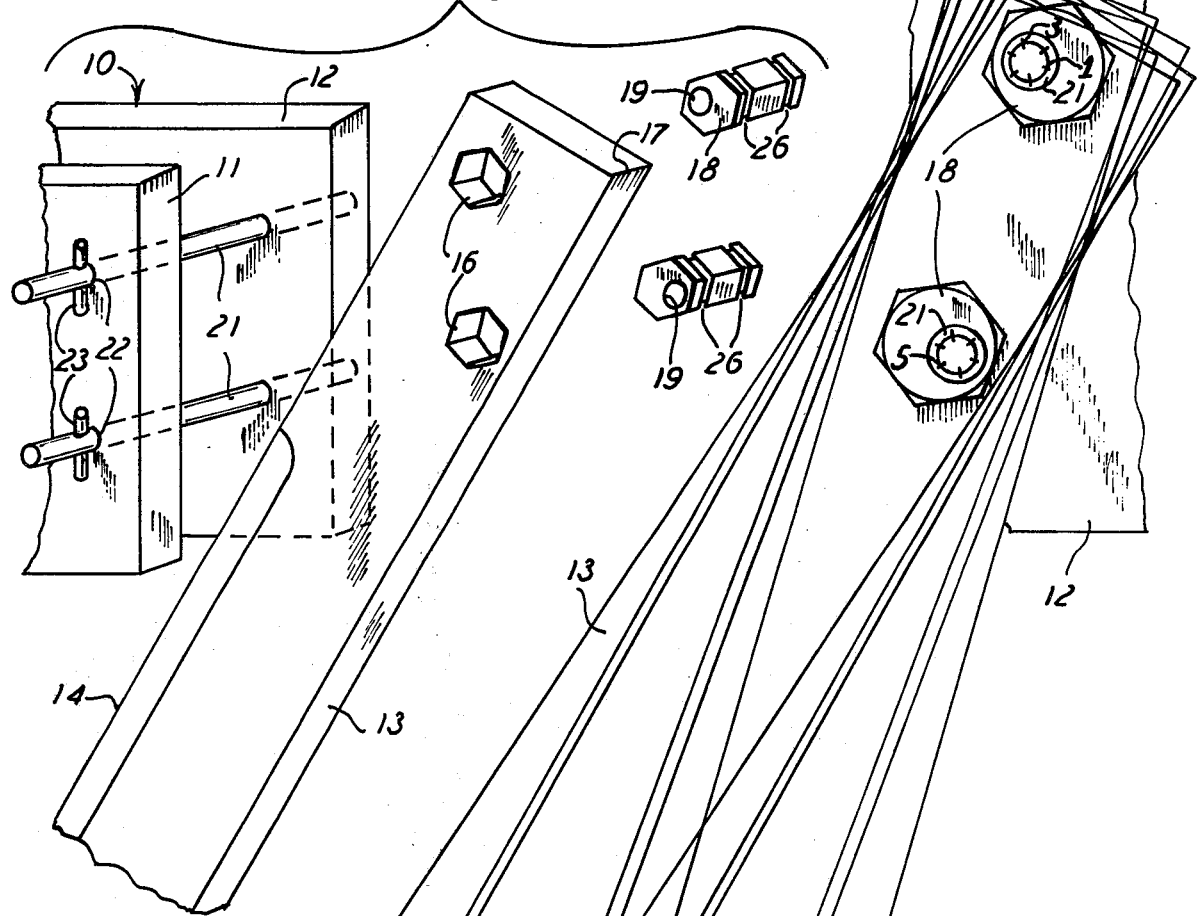
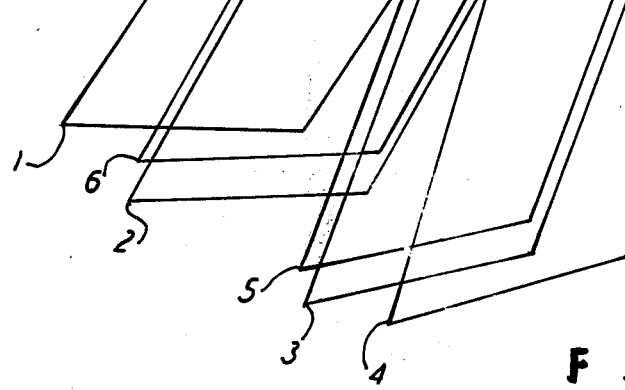
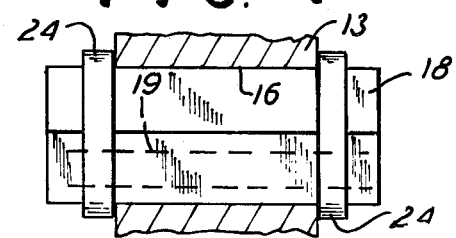

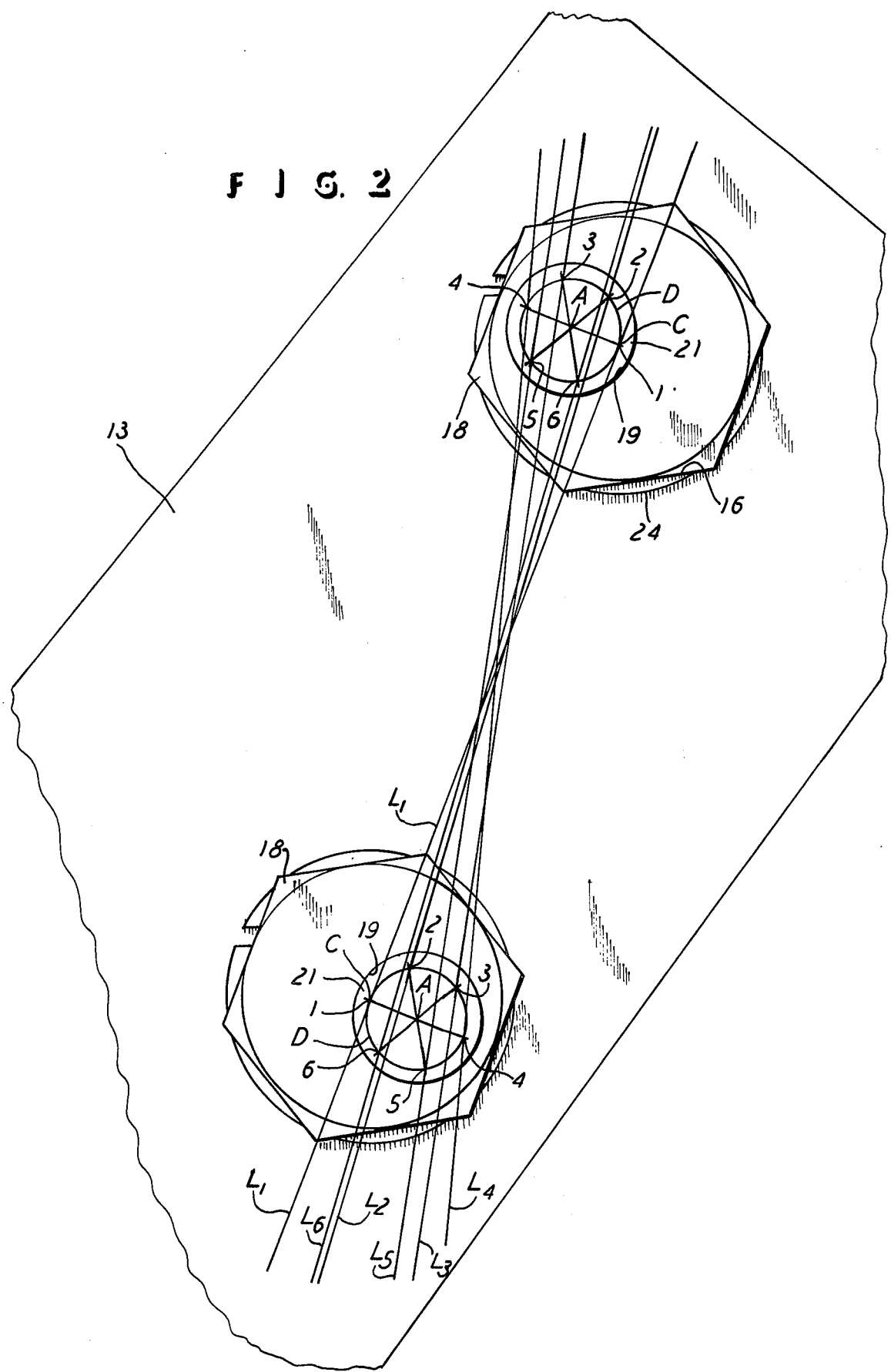

ADJUSTABLE MOUNTING FOR SUBTERRANEAN TOOL

This invention relates to an adjustable mounting for a subterranean tool such as a tool which is useful in forming a cut in the ground and providing an opening for laying cable or the like in the ground.

BACKGROUND OF THE INVENTION

The prior art is already aware of various types of tools which are used for cutting or working the ground, even including tools such as plows, cultivators, turf slicers and cutters for cable laying, and the like. In those prior art examples, a mobile support unit, such as a tractor, is used for supporting and presenting the earth-working tool to the ground and for directing it to penetrate the ground as desired. Further, the ground-working and penetrating tool commonly has a forwardly-located cutting edge which may be at some angle of relationship with the horizontal when in the ground, other than a right angle, and the tool may also be vibrated for optimum efficiency in forming the cut in the ground. Most particularly, cable or subterranean line laying machines utilize ground penetrating tools of which the tool of the present invention is particularly concerned about.

Accordingly, U.S. Pat. Nos. 2,632,265 and 3,618,237 and 3,363,423 and 3,396,804 are examples of prior art tools which are of the line or cable laying type and which can commonly employ a ground-engaging blade and a vibrator for moving the blade in its action of penetrating the ground. However, those prior art tools are mounted on a tractor-like mobile support at some fixed angle relative to the tractor vibrator mounting portion, and thus there is no provision for altering the angulation of the tool relative to the ground for giving the optimum speed of movement through the ground or for giving the least amount of ground disturbance or for giving maximum efficiency in the use of the machine, all as related to the end condition desired and to the condition of the ground being worked upon.

Accordingly, it is an object of this invention to improve upon the prior art in the manners aforesaid. Still further, the present invention produces the improvement and advantages mentioned, and it does so with a relatively uncomplex but reliable and simple type of machine and adjustable mounting for the ground-penetrating tool on the machine. Still further, and more explicitly, the present invention provides an adjustable type of mounting for a ground-working tool wherein the adjustment can be readily and easily accomplished in a multiplicity of different positions for the ground-engaging tool, all according to the different work conditions encountered and the different and desired effects of speed and soil conditions and the like.

Other objects and advantages include the provision of an adjustable mounting for a ground-engaging tool wherein the prior art type of tool can be readily and easily adapted to accommodate the adjustable mounting of this invention, and no complex and extensive revisions of the prior art machines or tools are required. Still further, the adjustment mounting of this invention is arranged so that the operator can readily and easily see which adjusted position he has achieved for the ground-working tool, and he can also very readily alter the adjusted position and the structural elements are so arranged that he cannot make a mistake in making an adjustment in a manner to preclude proper assembly of the adjustable elements. That is, the adjustable elements are arranged so that they must be placed in a proper position before they can be utilized, and such position is readily accomplished but must be accomplished and therefore must be correct before the adjustment can be fully accomplished.

Other objects and advantages will become apparent upon reading the following description in light of the accompanying drawings.

BRIEF DESCRIPTION OF THE DRAWINGS

FIG. 1 is an exploded side perspective view of a tractor frame and the adjustment mounting and tool of this invention.

FIG. 2 is an enlarged side elevational view of the adjustment mounting shown in FIG. 1.

FIG. 3 is a diagrammatic side elevational view showing the tool in its various positions.

FIG. 4 is an end elevational view of the adjustment mounting of this invention.

DETAILED DESCRIPTION OF THE PREFERRED EMBODIMENT

FIG. 1 shows the machine of this invention to include the machine vibratory frame 10 which has spaced-apart mounting plates 11 and 12 and which is of a conventional nature and is therefore readily understood by one skilled in the art to be a vibratory type of machine such as that used in line or cable laying, and, for still further description, references made to U.S. Pat. No. 3,618,237 which shows a cable laying machine having a tool or blade mounting frame such as that designated and shown as 10 herein. That is, there would of course be an entire tractor for mobilizing the machine of this invention and it is made according to that which would be understood by one skilled in the art and therefore need not be further shown herein, but the aforesaid patent is incorporated by reference in this disclosure.

The frame members 11 and 12 are two spaced-apart plates or the like as part of the machine and form the vibratory frame thereof, as mentioned, and they therefore position and receive the ground-working tool 13 which is in the form of a ground-penetrating blade. The tool 13 is preferably arranged with a forwardly-located cutting edge 14, and the tool can be mounted to have the edge 14 at an angle other than 90° relative to the ground surface.

The upper end of the tool 13 has two multi-sided openings 16 which are shown to be each hexagonally shaped and which are spaced apart in the up-and-down direction relative to the longitudinal extent of the tool, and the openings 16 fully extend through the tool thickness designated 17. Two correspondingly multi-sided nuts or bushings 18 are also included in the mounting, and they are of the hexagonal shape of the opening 16 and are of a size to be snug within the opening 16, such as shown in FIG. 2. It will be further seen and understood that the orientation, that is the direction of the respective sides of the hexagonally-shaped openings 16 in the tool 13, are similar, that is the respective sides are parallel to each other.

Each nut or bushing 18 has a cylindrical hole 19 extending through the thickness thereof, and it will be seen and understood that the holes 19 are offset relative to the central axis of each of the bushings 18. The bushing holes 19 are of a circular size to snugly receive mounting pins 21 which extend between and are supported by the spaced-apart vibration plates 11 and 12. The pins 21 are preferrably removable from the plates 11 and 12 by sliding through openings 22 extending in alignment between the plates 11 and 12 and therethrough, and lock pins 23 can be removably extended through the supporting pins 21 to permit removable securing of the pins 21 relative to the plates 11 and 12.

With the structure described, it will be seen and understood that the pins 21 can be removed from the plates 11 and 12 and the bushings 18 will be snugly inserted in the blade openings 16. The pins 21 are then reinserted in the plates 11 and 12 and extend through the bushing openings 19 and thus secure the blade 13 relative to the spaced-apart plates 11 and 12.

Since the blade multi-sided opening 16 and the multi-sided bushings 18 are of the same size and shape and the same number of sides, the bushings 18 can be rotated to various positions relative to the openings 16. Of course with the hexagonal shapes shown in this specific embodiment, there are six different positions for each of the bushings 18 within the respective openings 16. As such, there are six adjustable positions for the blade 13. Of course it will be further seen and understood that the bushings 18 will be positioned in coordination with each other such that the axes of the bushing pinholes 19 remain a fixed distance apart in all rotated or adjusted positions of the bushings 18, and that distance of course is the fixed distance between the axes of the mounting pins 21.

FIG. 2 shows the axes of the pins 21 to be designated A. FIG. 2 also shows the blade 13 to be in one set position and this position is defined and established relative to the blade line $L_1$ which extends through the center of the opening 16 and thus the center of the bushings 18, and those two centers are coincident and are designated C. It will then be seen and understood that when the bushings 18 are removed from the openings 16 and are set to another adjusted position, then the centers C would move about the axis A and thus the actual movement would be on a circle designated D.

Accordingly, the position of the blade 13 shown in FIG. 2 is designated position no. 1 which is placing the coincident center axes of the openings 16 and the bushings 18 on the center designated C. If the upper bushing 18 were removed and rotated 60° counterclockwise to where the center C would be at a position designated 2 then the lower bushing 18 would be rotated 60° clockwise to where its center C would be at the position 2 on the lower bushing. This would cause the so-called reference line $L_1$ of the blade 13 to take the position designated $L_2$. In that adjustment, it will be understood that the distance between the two positions designated 2 for the new centers C of the bushings 18 remains the same as required which is the distance between the axes of the mounting pins 21. Of course because the multi-sided bushings 18 are shown to be hexagonal, all of the adjustments are in 60° increments.

Tracing through the adjustments such as the one described above will reveal how the blade can be placed in the six adjusted positions indicated in FIGS. 2 and 3. Of course it will be understood that FIG. 3 is schematic and does not show the full blade but does show the adjustment of the blade 13 and the numbers 1 through 6 at the lower tips of the blade 13 in FIG. 3 indicate the six adjustment positions being described.

Further, FIGS. 2 and 3 show that there are actually four different angles achievable with the adjustable mounting described, and thus the blade positions 2 and 6 are parallel and also the blade positions 3 and 5 are parallel and thus there are the six blade positions with the four blade angles as shown and described.

Thus the multi-sided openings 16 and the similarly multi-sided bushings 18 are symmetrical and identical in shape and size, as mentioned. The bushing eccentric holes 19 are offset to opposite sides of the hex openings with their center axes C, and thus the distance between the axes A of the pins 21 is always maintained by the opposite positioning or setting of the bushing openings 19, all as shown in the drawings.

While the openings 16 and the bushings 18 are shown to be six-sided, it will be readily understood that they may be of any number of sides greater than three, and the holes 19 in the bushings 18 would of course be offset from the center of any multi-sided configuration being utilized. Accordingly, the number of blade positions is always equal to the number of multi-sides, and the blade angles will be two fewer than the total number of multi-sides, such as the example shown relative to the six-sided figures.

The axial length of the bushings 18 is preferrably greater than the thickness 17 of the blade 13 at the point of the opening 16, and thus snap rings 24 can be received in the grooves 26 on each extending end of each bushing 18, as shown in FIG. 4, and thus the bushings 18 are axially secured relative to the blade 13. Of course the snap rings 24 are readily removable so that the adjustment of the bushings 18 can be readily achieved as described.

What is claimed is:

1. An adjustable mounting for a subterranean tool, comprising two spaced-apart mounting pins, a subterranean tool having two multi-sided openings spaced apart at the spacing of said pins to be respectively aligned with said pins and being respectively larger than the cross-section of said pins and each of said openings having an axis central with respect to all the sides of each of said openings, a multi-sided bushing snugly removably disposed in each of said openings and having an eccentric hole therein offset from said central axis of each of said openings and being of a cross-sectional size to respectively snugly receive each of said pins, said multi-sided openings and said multi-sided bushings being symmetrical and identically shaped for removal and rotation of said bushings about their respective central axes and for re-insertion snugly into said openings for re-positioning said eccentric holes relative to said tool, and with said eccentric holes being spaced apart a distance identical to the spacing between said pins in co-ordinated rotation and re-insertion of said bushings, for adjusting the angle of said tool relative to said pins.

2. The adjustable mounting for a subterranean tool as claimed in claim 1, wherein said multi-sided openings and said multi-sided bushings are hexagonally shaped for presenting six different positions of said tool relative to said mounting pins.

3. The adjustable mounting for a subterranean tool as claimed in claim 2, wherein said tool is an elongated blade having a sharpened edge at one end thereof and having said multi-sided openings at the other end thereof, for selective altering of the position of said sharpened edge relative to said mounting pins.

4. The adjustable mounting for a subterranean tool as claimed in claim 3, wherein said blade has a thickness extending in the direction parallel to the axes of said multi-sided openings, and said bushings each having a length along the axis of the hole therein longer than the thickness of said blade, to have said bushings project on the opposite sides of said blade, and removable fasteners on the projecting ends of said bushings for removably securing said bushings to said blade.

5. The adjustable mounting for a subterranean tool as claimed in claim 1, including removable fasteners engaged with said bushings for removably securing said bushings to said tool.

6. The adjustable mounting for a subterranean tool as claimed in claim 1, wherein said multi-sided bushings each have at least three sides, and said eccentric holes are offset relative to said three sides, and said bushings are co-ordinated positionable in as many positions as there are multi-sides so that said tool is likewise positionable and also so that said tool is angle-oriented relative to said mounting pins in two fewer angles than the total number of said multi-sides.

7. The adjustable mounting for a subterranean tool as claimed in claim 6, wherein said multi-sides are six in total number, and said tool positions are six in total number and said tool angles are four in total number.

8. The adjustable mounting for a subterranean tool as claimed in claim 1, including a ground-mobile support frame of a vibratory type, said two mounting pins being supported on said frame for transmitting vibration from said frame to said tool and thereby assist in the penetration of said tool into the ground.

9. The adjustable mounting for a subterranean tool as claimed in claim 3, including a ground-mobile support frame of a vibratory type, said two mounting pins being supported on said frame for transmitting vibration from said frame to said blade and thereby assist in the penetration of said blade into the ground.

* * * * *